2,813,838
Patented Nov. 19, 1957

2,813,838

BORON-ADSORBING RESIN AND PROCESS FOR REMOVING BORON COMPOUNDS FROM FLUIDS

William R. Lyman, Abington, and Albert F. Preuss, Jr., Hatboro, Pa., assignors to Rohm & Haas Company, Philadelphia, Pa., a corporation of Delaware No Drawing. Application February 7, 1955,
Serial No. 486,702

7 Claims. (Cl. 260—2.1)

This invention relates to the preparation of insoluble resins which remove boron compounds preferentially from solutions. It also relates to the use of such resins in the separation of boron compounds from solutions.

It is an object of this invention to provide an insoluble resin which has a specificity for boron compounds and which is capable of removing boron compounds preferentially from solutions thereof. It is also an object to provide a practical process whereby dissolved boron compounds are selectively removed from aqueous solutions, including solutions which contain other dissolved salts.

As shown in U. S. Patent 2,402,959, there are occasions where it is most desirable to remove contaminating boron compounds—usually borates—from solutions of salts of other metals, such as magnesium, since the presence of the boron compounds interferes with the winning of the other metal. Also there is a real demand for a method of removing boron compounds from waters which are needed for irrigation. This is a most important problem in the southwestern part of the United States where borax, borates, boric acid or borosilicates are almost invariably present in natural waters and greatly restrict the use of such waters for irrigation purposes or in industrial operations. (See "Water Quality Criteria," pp. 149–153 (1952), State Water Pollution Control Board, Sacramento 14, California.)

This invention provides insoluble resinous adsorbants which are able to remove borates from solutions while, at the same time, leaving ions of other metals in solution. This invention also provides a process which can be used on a large and commercially practicable scale.

The resins of this invention which have a specificity for boron compounds are the products obtained by reacting certain amines with a haloalkylated, cross-linked, insoluble copolymer of a monovinyl aromatic hydrocarbon and a compound which is copolymerizable with said monovinyl hydrocarbon and which contains at least two non-conjugated groups of the structure $CH_2=C=$. The amines which are reacted are those which have the structure R—NH—Z, wherein R is a monovalent organic compound, preferably a hydrocarbon group, and Z is a pentahydroxyhexyl group, $-C_6H_8(OH)_5$, or a tetrahydroxypentyl group, $-C_5H_6(OH)_4$, from the class consisting of the sorbityl, mannityl, galactityl (dulcityl), talityl, arabityl and ribityl groups.

These amines are either available commercially or can be made by reacting under reducing conditions an amine $RNH_2$ with the following hexoses or pentoses: glucose, gulose, mannose, galactose, talose, altrose, arabinose and ribose. Because of its availability and ease of reaction, glucose is the carbohydrate of first choice; and it gives rise to amines, R—NH—Z, in which the Z-group is the sorbityl radical.

The R group present in the intermediate, $RNH_2$, and also in the amine, R—NH—Z, can be aliphatic or aromatic. This group is typified by the following: methyl, ethyl, n-propyl, isopropyl, n-butyl, sec-butyl, tert-butyl, hexyl, lauryl, octadecyl, cyclohexyl, phenyl, benzyl, and naphthyl groups as well as the homologues and isomers of those listed. The group R of the amine, $RNH_2$, remains intact during the preparation of the amine, R—NH—Z, and during the formation of the final resinous product. The group Z likewise remains intact throughout. In reality, however, it is much preferred that the group which is represented by R above be a lower alkyl group; and the methyl group is the one of first choice. One reason for this preference is that the capacity of the final resin, on a weight basis, for adsorbing boron compounds is inversely proportional to the size of the group which is represented by R. That is to say, the larger the group which is represented by R, the lower is the capacity of the final resin per unit of weight.

From the standpoints of economy, ease of preparation and the properties of the resinous adsorbant, it is much preferred to employ N-methylglucamine, otherwise known as methylsorbitylamine,

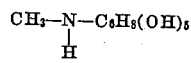

which is made by catalytically hydrogenating glucose in the presence of methylamine.

The products of this invention are made by a series of steps, the first of which comprises preparing an insoluble copolymer of an aromatic vinyl hydrocarbon, preferably styrene, and a polyvinyl, copolymerizable, cross-linking agent, preferably divinylbenzene. The following steps comprise haloalkylating, preferably chloromethylating, the copolymer, and thereafter reacting the amine, R—NH—Z, with the haloalkylated copolymer. This procedure, aside from the use of the particular kind of amine, R—NH—Z, is essentially like the process described in U. S. Patent No. 2,591,574 to which reference is made.

Thus, an insoluble, cross-linked copolymer of a monovinyl hydrocarbon and a cross-linking agent containing two or more non-conjugated vinylidene groups, $CH_2=C=$, is first prepared. Suitable monovinyl compounds include styrene, which is much preferred, vinyltoluene, vinylnaphthalene, ortho-, meta-, and para-ethyl styrenes, vinylanthracene, and homologues and isomers of the above. Suitable copolymerizable, cross-linking agents include divinylbenzene, which is much preferred, divinyltoluenes, divinylnaphthalenes, divinylethylbenzenes, divinylxylenes, trivinylbenzenes, diallyl esters such as diallyl phthalate and doubly unsaturated esters such as ethylene glycol diacrylate and dimethacrylate. What is required is that the cross-linking agent be copolymerizable with the monovinyl compound and that it contain a plurality of $CH_2=C=$ groups. As little as 0.5% on a molar basis, of the cross-linking agent and as much as equal parts of the monovinyl compound and the cross-linking agent, on the same basis, can be used; but it is preferred that the cross-linker constitute from 0.5% to 15% of the copolymerizable mixture on a molar basis. Obviously mixtures of two or more monovinyl compounds and two or more cross-linking agents can be copolymerized if necessary or desirable.

The insoluble, cross-linked copolymers can be prepared by polymerizing the monomeric mixtures in bulk, in a solvent, in emulsion, or in suspension. Suspension polymerization, wherein a copolymerizable mixture is suspended by agitation in a medium such as water which is not a solvent for the monomers and is therein polymerized, is much preferred because it gives rise to products which are in the form of small discrete beads or spheroids. Since the copolymerization reaction is accelerated by heat and catalysts of the free-radical type, it is advisable to employ any convenient temperature above 50° C.—preferably a temperature from 50° to 90° C. in the case of suspension polymerization—and to use a catalyst. Suitable catalysts include dimethyl azobisisobutyrate, α,α'-bisazoisobutyronitrile, benzoyl peroxide, acetyl peroxide, lauroyl peroxides, tert-butyl hydroperoxide, di-tert-butyl peroxide, stearoyl peroxides, and "per-salts" such as ammonium perborate and ammonium persulfate. The catalysts are used in amounts from 0.2% to 5%—and preferably from 0.5% to 2%—based on the weight of the polymerizable compounds.

In the next step, the insoluble, cross-linked copolymer is haloalkylated. Actually it is preferred, for the sake of ease and economy, that the copolymer be chloromethylated, whereby chloromethyl groups, —$CH_2Cl$, become attached to the hydrocarbon units in the copolymer. The copolymer can be reacted, for example, with a mixture of an aldehyde and hydrochloric acid or a mixture of a dihalide and a Friedel-Crafts catalyst. Methods of chloroalkylating which may be used for introducing the —$CH_2Cl$ group and which also serve as guides for introducing —$C_2H_4X$, —$C_3H_6X$, —$C_4H_8X$ groups, wherein X represents an atom of chlorine or bromine, are described in "Organic Reactions," vol. I, chapter 3, page 63 et seq. (John Wiley & Sons, Inc., New York city, 1942). Since the capacity of the final resin is proportional to the number of Z-groups which it contains and since the number of such groups cannot be more than the number of haloalkyl groups which are first introduced, it is most desirable that the haloalkylation reaction be carried as far as is conveniently possible. The extent of the haloalkylation reaction can be determined by a halogen analysis. Very valuable resins are those made by aminating, with N-methylglucamine, copolymers which contain from two to six haloalkyl groups for every four aromatic nuclei in the cross-linked copolymer.

The next step in the formation of the product of this invention is the reaction of the amine, R—NH—Z, with the haloalkylated copolymer. This reaction is preferably carried out in a liquid which is a solvent for the amine and which also swells the particles of the haloalkylated copolymer. Dimethylformamide is a very satisfactory solvent for this purpose. Reaction takes place fairly readily at temperatures above 50° C.; and temperatures up to the boiling point of the reaction mixture can be used. The reaction is facilitated if the particles of haloalkylated resin are first swollen by immersion in an organic liquid such as benzene, toluene, or ethylene dichloride or dimethylformamide.

The following examples serve to illustrate further the method of making the compounds of this invention and the procedure by which they are employed in the adsorption of borates.

Example I

A. Into a reactor equipped with thermometer, agitator and reflux condenser was charged 1500 ml. of water and 150 ml. of a 1.5% aqueous dispersion of magnesium silicate. Agitation was begun and a solution containing 390 grams of styrene, 10 grams of the technical grade of divinylbenzene (equivalent to approximately 4 grams of divinylbenzene and 6 grams of ethylstyrene) and 4 grams of benzoyl peroxide was added to the contents of the reactor. The stirred mixture was heated to 90° C. and held there for 1.5 hours after which it was heated to refluxing temperature and held there for an additional period of 1.5 hours. The mixture was cooled to room temperature and the particles of resin were separated from the liquid phase, thoroughly washed and finally dried in an oven at 125° C.

B. Next, 315 grams of the cross-linked copolymer prepared in Part A above was placed in a reactor equipped with thermometer, agitator and reflux condenser. This amount corresponds to 3.0 moles of styrene in the form of the cross-linked copolymer. Then 360 grams of chloromethyl methyl ether, $ClCH_2OCH_3$, and 3600 grams of ethylene dichloride were added and the mixture was stirred for one hour at about 30°. While the temperature was held between 30° and 40° C., a total of 150 grams of aluminum chloride was added slowly to the stirred mixture over a period of two hours. Thereafter the mixture was stirred for 8 hours at 30° to 40° C. Then to the mixture was added twice its volume of cold water; and stirring was continued for an hour. The beads of resin were separated, were washed to neutrality with water and finally were dried in an oven at 120° C.

C. Into a reactor equipped with thermometer, stirrer and reflux condenser were charged 300 grams of the chloromethylated beads prepared in Part B above, 1700 ml. of dimethylformamide and 665 grams of N-methylglucamine. The stirred mixture was heated to 100° C. and was held there for three hours, after which it was cooled to 50° C. and was treated with approximately an equal volume of water. Stirring was continued for 10 minutes. The particles of resin were drained free of liquid and were then placed in a cylinder through which water was circulated for two hours in order to remove dimethylformamide and unreacted amine. The column of resin was drained and a total of 948 grams of moist resin (49.6% solids) was obtained.

This resin had a high capacity for removing borates from aqueous solutions as is evident from the following example.

Example II

The resin, prepared above, was placed in a typical ion-exchange column and through the column of resin was passed an aqueous solution which contained 10.8 parts per million (written as p. p. m. hereafter) of boron, as boric acid, and 500 p. p. m. of sodium chloride. Successive portions of the effluent from the column were tested for boron; and it was not until a volume of solution equal to 370 times the volume of the column of resin had passed through that 1 p. p. m. of boron was present in the effluent. It should also be noted that the concentration of sodium chloride in the effluent remained at the original level of 500 p. p. m.

The bed of resin was drained and then regenerated by means of a 2% solution of sulfuric acid. It was finally rinsed with a dilute solution of ammonium hydroxide until the sulfuric acid had been neutralized. Thereafter the bed of resin was exhausted with boron solutions and was regenerated many times. Its average capacity for boron compounds was 0.4 millimole per milliliter of resin. Various regenerants were employed including 5% and 10% solutions of sulfuric acid; 2% and 5% solutions of hydrochloric acid (recommended when magnesium salts are present); 5% and 10% solutions of ammonium hydroxide; and 2% and 5% solutions of sodium hydroxide. It is to be noted that regeneration with strong acids is much more efficient than with strong bases or with ammonium hydroxide and consequently the use of acids is preferred. As is evident, the regenerant removes the previously adsorbed boron compounds and the latter can be recovered, if desired, from the spent regenerant.

Many solutions of borates containing various metals such as the alkali metals and alkaline earth metals have been treated with the resins of this invention and in every case only the boron compounds have been removed, thus showing the specificity of the resin for boron compounds. For example, a solution containing 12% magnesium chloride and 100 p. p. m. of boron, as boric acid, was passed through the bed of resin. Over 20 bed volumes of effluent was obtained which had a boron-content of less than 0.1 p. p. m.; and all of the original magnesium chloride was present in the effluent.

Another noteworthy fact is that the resins of this invention are also capable of adsorbing free acids from solution together with boron. Acid adsorption takes place on the nitrogen atoms of the resins.

We claim:
1. A resinous product capable of removing boron com- pounds from solutions thereof which comprises an insoluble cross-linked copolymer of a mixture of an aromatic hydrocarbon having a vinyl group as its sole aliphatic unsaturation and a copolymerizable cross-linking agent which contains at least two groups of the structure $CH_2=C=$, said cross-linking agent being present in molar amounts equal to 0.5% to 50% of said aromatic monovinyl hydrocarbon, said copolymer having attached to the aromatic nuclei thereof groups of the structure $$-C_nH_{2n}-N(R)-Z$$

in which $n$ is an integer of value 1 to 4, R represents a monovalent hydrocarbon group, and Z represents a radical from the class consisting of the sorbityl, mannityl, galactityl, talityl, arabityl, and ribityl radicals.

2. A resinous product capable of removing boron compounds from solutions thereof which comprises an insoluble cross-linked copolymer of a mixture of an aromatic hydrocarbon having a vinyl group as its sole aliphatic unsaturation and a copolymerizable cross-linking agent which contains at least two groups of the structure $CH_2=C=$, said cross-linking agent being present in molar amounts equal to 0.5% to 50% of said aromatic monovinyl hydrocarbon, said copolymer having attached to the aromatic nuclei thereof groups of the structure $$-CH_2-N(R)-Z$$

in which R represents a monovalent hydrocarbon group, and Z represents a radical from the class consisting of the sorbityl, manityl, galactityl, talityl, arabityl, and ribityl radicals.

3. A resinous product capable of removing boron compounds from solutions thereof which comprises an insoluble cross-linked copolymer of a mixture of an aromatic hydrocarbon having a vinyl group as its sole aliphatic unsaturation and a copolymerizable cross-linking agent which contains at least two groups of the structure $CH_2=C=$, said cross-linking agent being present in molar amounts equal to 0.5% to 15% of said aromatic monovinyl hydrocarbon, said copolymer having attached to the aromatic nuclei thereof groups of the structure $$-CH_2-N(CH_3)-C_6H_8(OH)_5$$

in which the $-C_6H_8(OH)_5$ portion is the sorbityl radical.

4. A resinous product capable of removing boron compounds from solutions thereof which comprises an insoluble cross-linked copolymer of a mixture of styrene and a copolymerizable cross-linking agent which contains at least two groups of the structure $CH_2=C=$, said cross-linking agent being present in molar amounts equal to 0.5% to 15% of said styrene, said copolymer having attached to the aromatic nuclei thereof groups of the structure $-CH_2-N(CH_3)-C_6H_8(OH)_5$ in which the $$-C_6H_8(OH)_5$$

portion is the sorbityl radical.

5. A resinous product capable of removing boron compounds from solutions thereof which comprises an insoluble cross-linked copolymer of a mixture of 85% to 99.5%, on a molar basis, of styrene and 0.5% to 15%, on a molar basis, of divinylbenzene, said copolymer having attached to the aromatic nuclei thereof groups of the structure $-CH_2N(CH_3)C_6H_8(OH)_5$ in which the $$-C_6H_8(OH)_5$$

portion is the sorbityl radical.

6. A process for removing boron compounds from solutions thereof which comprises bringing said solutions in contact with the product of claim 1.

7. A process for removing boron compounds from solutions thereof which comprises bringing said solutions in contact with the product of claim 5.

References Cited in the file of this patent

UNITED STATES PATENTS

| | | |
|---|---|---|
| 2,362,086 | Myers et al. | Nov. 7, 1944 |
| 2,541,492 | Anderson et al. | Feb. 13, 1951 |
| 2,591,574 | McBurney | Apr. 1, 1952 |